Figures 1, 2:
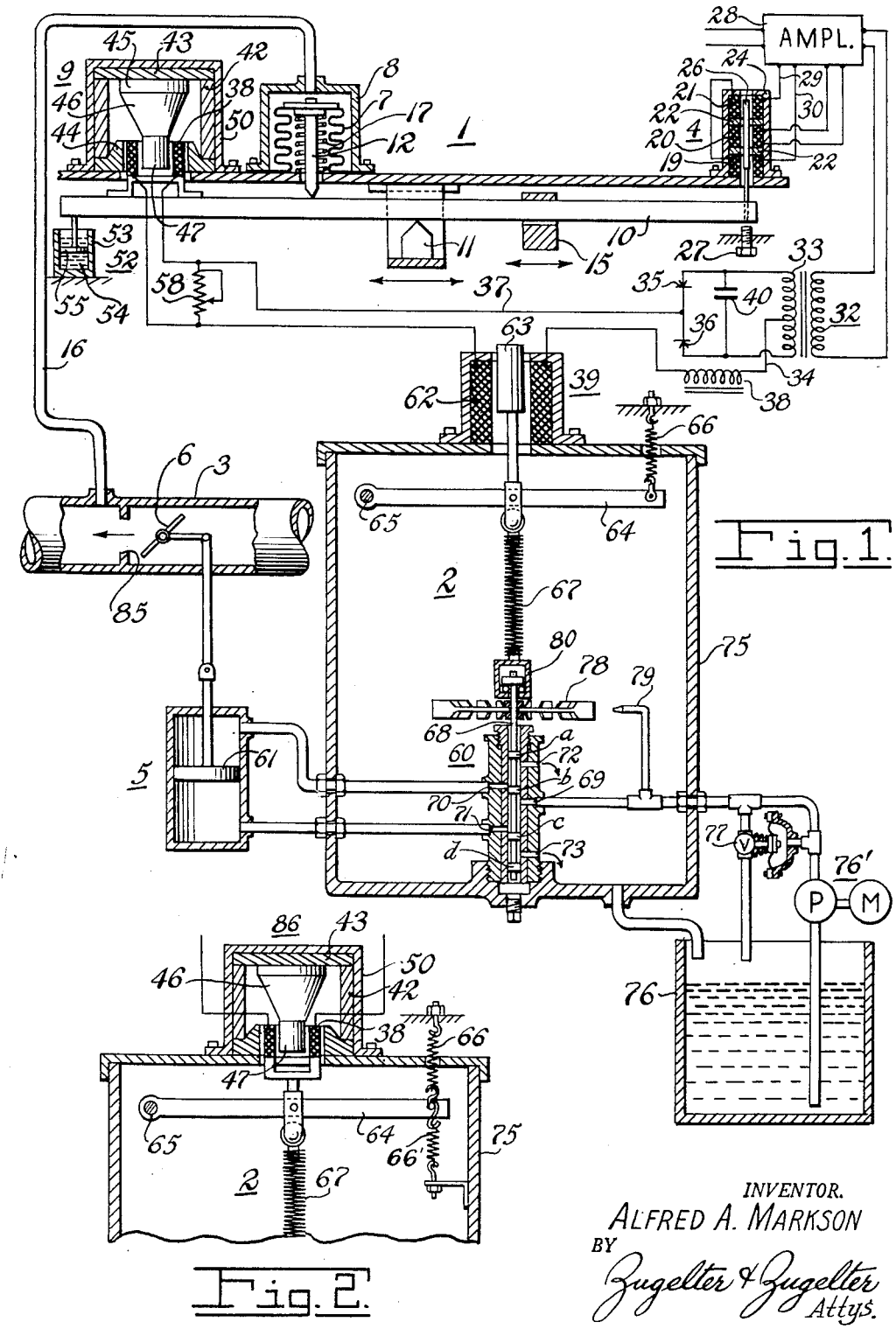

April 14, 1953 — A. A. MARKSON — 2,634,747
REGULATING APPARATUS
Filed Nov. 2, 1950

INVENTOR.
ALFRED A. MARKSON
BY Zugelter & Zugelter
Attys.

Patented Apr. 14, 1953

2,634,747

UNITED STATES PATENT OFFICE 2,634,747

REGULATING APPARATUS

Alfred A. Markson, Mount Lebanon Township, Allegheny County, Pa., assignor to Hagan Corporation, Pittsburgh, Pa., a corporation of Pennsylvania Application November 2, 1950, Serial No. 193,729

9 Claims. (Cl. 137—488)

1

This invention relates to regulating apparatus and more particularly to apparatus having means that responds to a variable such as a fluid pressure, and that converts that response to an electric output, and a regulating device that may be located at a point remote from the variable responsive means for regulating the fluid pressure in accordance with a function of the electric output.

An object of this invention is to provide a regulating apparatus comprising two major components one of which may be located at a point where a variable is measured to develop an electric output in accordance with the magnitude of the variable, and the other of which may be located at a point relatively remote from the first component for regulating the variable in accordance with a function of the electric output.

Another object of the invention is to provide a regulating apparatus of the type set forth above that shall be sensitive and accurate in operation and readily adapted to meet the requirements of regulating problems encountered in practice.

The above and other objects of the invention will in part be apparent, and will in part be obvious, from the following description taken in conjunction with the accompanying drawings, in which:

Fig. 1 is a more or less diagrammatic view of regulating apparatus arranged and constructed in accordance with an embodiment of the invention; and Fig. 2 is a partial view in section of a modified form of one of the components embodied in the arrangement of Figure 1.

In Figure 1 of the drawings, regulating apparatus is illustrated, comprising two major components 1 and 2. Component 1 is a device that responds to a variable such as the pressure of a fluid flowing in a pipe line or conduit 3 and develops an electric output by means of a differential transformer 4. The magnitude of electric output from the differential transformer 4 is proportional to the change in pressure as measured by component 1.

Component 2, as illustrated, is a regulator, the operation of which is effected by the electric output of component 1. The regulator in turn controls the operation of a power cylinder 5 that actuates a damper or valve 6 in pipe 3 to control the flow therethrough in accordance with a function of the electric output of transformer 4.

Component 1 comprises a pressure deflectable

2 member 7 such as a bellows, disposed within a pressure tight housing 8, the differential transformer 4, an electro-magnetic balancing device 9 and a beam 10 mounted on a fulcrum 11, member 7 and balancing device 9 are disposed on one side of fulcrum 11, while differential transformer 4 is disposed on the opposite side of fulcrum. The output of transformer 4 is determined by the extent of movement of beam 10 on the fulcrum from a fixed or neutral position. The beam may be provided with a sliding weight 15 by means of which the beam may be balanced against the weight of the component parts of the differential transformer, bellows 7 and balancing device 9.

The variable to be measured, which, in the case shown in the drawings, is a pressure, is communicated to housing 8 by means of a pipe 16. The force exerted by bellows 7 on the beam is proportional to the area of the bellows and the pressure in housing 8. If desired, a light compression spring 17 may be mounted within the bellows which supports merely the weight of push rod 12 and supplies a slight returning force on the bellows, that is, a force that tends to keep it in an expanded condition when no pressure is applied thereto. The spring is optional, and may be omitted if desired.

The differential transformer 4 comprises three coil windings 19, 20 and 21, mounted one upon the other in co-axial relationship, the windings being spaced by spacers 22. The windings are disposed within a split magnetic sleeve 24, which serves as a stationary core therefor. Windings 19 and 21 are connected in series but differentially with respect to each other. The transformer also includes a movable core 26 which is connected to beam 10. As shown, the core is arranged to be moved from the neutral position in which the induction in winding 20 is zero, upwardly through the windings to a maximum position in which the induction in winding 20 will be a maximum. An adjustable stop 27 is provided so that the core can not be moved downwardly past the neutral or zero induction voltage position.

Operating voltage for the differential transformer is supplied from a power pack amplifier unit 28. Coil windings 19 and 21 are connected to the power pack by conductors 29 and 30. The voltage supplied to these windings may be of the order of about six (6) volts. The output voltage of winding 20 is delivered to the amplifier where it is amplified and delivered as alternating or pulsating voltage to the primary winding 32 of a step-up transformer. The secondary winding 33 of the step-up transformer is provided with a mid-point tap 34 and rectifiers 35 and 36 connected across the outside terminals of secondary winding 33 so as to rectify the full output voltage from winding 33. The mid tap between rectifiers 35 and 36 is connected by a conductor 37 to a coil winding 38 of the electro-magnetic device 9. Conductor 34 which may include a voltage smoothening choke 38 is connected through an electromagnetic responsive device 39 of component 2 to coil winding 38. The rectifier unit may also be provided with a condenser 40 the same being connected across the terminals of winding 33.

Electro-magnetic device 9 comprises a permanent magnet consisting of a cylindrical core 42 which is closed at its upper end by a magnetic plate 43, a pole piece 44 disposed at the opposite end of the cylindrical core 42, and an internal core 45. The internal core has a truncated conical section 46 that terminates in a cylindrical section 47. As shown, the pole piece 44 is provided with an aperture through which the cylindrical section 47 extends in spaced relation to the walls of the aperture to form an air gap and coil winding 38 is disposed in that air gap. The permanent magnet may be housed in a shield or casing 50. The permanent magnet is constructed of such materials or alloys that it may be magnetized to a high degree and which will retain the magnetization substantially unimpaired over a long period of time. Since coil 38 operates in a permanent magnetic field the force exerted by it on beam 10 to which it is connected, will be linearly proportional to the value of the current traversing the coil.

In order to damp out vibration that may develop in beam 10, a damping device 52 is provided. Device 52 may comprise a cylinder 53 having a viscous fluid 54 therein, such as oil, and a loosely fitting piston 55 that is connected to the beam. In order to adjust the total amount of current passing through coil 38, an adjustable shunt 58 of relatively high resistance may be connected across the terminals to winding 38.

If it be assumed that the pressure acting on bellows 7 is zero, and beam 10 is in balance, movable core 26 will be in neutral position and the output voltage of winding 20 will be zero. If the pressure in housing 8 is increased to a value above zero, the force exerted by that pressure on bellows 7 will cause the beam to turn counterclockwise, thereby moving core 26 upwardly in the coil windings of the differential transformer 4. This will result in a voltage output from winding 20. The output is amplified and rectified and passed through winding 38. When current flows in winding 38 it exerts a force on beam 10 opposing the force of the bellows and when the two forces are in balance, core 26 will come to rest in a position that is determined by the magnitude of the force exerted by the bellows on the beam.

Component 2 is actuated in accordance with a function of the output voltage of differential transformer 4 as will appear from the following.

Component 2 comprises the electro-magnetic and current responsive device 39 and a pilot valve 60 that is actuated thereby. The particular pilot valve illustrated is one designed to control the flow of a liquid such as oil, to either end of power cylinder 5 so as to cause the piston 61 thereof to move in one direction or the other under the control of the pilot valve. When the pilot valve is in neutral position the piston is at rest. If the pilot valve is actuated to one side or the other of neutral, the piston will move until the valve is returned to neutral position.

Device 39 comprises a stationary coil winding 62 and a movable core 63, core 63 being of a material which is magnetized in proportion to the ampere turns of winding 62. Therefore, the force or pull developed by core 63 will be proportional to the square of the current traversing coil 62. Core 63 is connected to a beam 64 that is pivoted at 65. The beam is connected to a tension spring 66 that opposes the force of core 63 on the beam. Beam 64 is connected through a resilient link, such as a tightly wound spring, to the valve stem 68 of valve 60. The valve stem controls the flow of fluid such as oil, from its inlet port 69 to one or the other of its outlet ports 70 and 71. The valve also is provided with exhaust ports 72 and 73.

The valve stem is provided with spaced lands $a$, $b$, $c$, and $d$, lands $a$ and $b$ being above and below the exhaust ports 72 and 73, respectively, and lands $c$ and $d$ being positioned to control outlet ports 70 and 71. The outlet port 70 is connected to the upper end of power cylinder and outlet port 71 is connected to the lower end thereof. When the valve stem is in neutral position, lands $b$ and $c$ cover outlet ports 70 and 71. If the stem is moved upwardly, outlet port 70 is placed in communication with inlet port 69, while outlet port 71 is placed in communication with exhaust port 73. As fluid under pressure is delivered to the upper end of the cylinder, fluid exhausts from the lower end through ports 71 and 73, whereby the piston moves downwardly. The piston will move downwardly until the valve stem is centered or returned to neutral position. If the valve stem is moved downwardly from neutral, outlet port 70 is connected to exhaust port 72 and outlet port 71 is connected to inlet port 69 so that the fluid pressure is delivered to the lower end of the cylinder and exhausted from the upper end thereby causing the piston to move upwardly.

Since valve 60 is an hydraulic pilot valve it is mounted within a housing 75 so that the fluid discharged from the exhaust ports may be returned to a supply tank 76, from which the fluid is pumped and delivered to the inlet port 69 by means of a motor driven pump 76'. The fluid pressure is regulated by a diaphragm actuated bypass valve 77. Valve 77 allows the fluid discharged from the pump to be returned to the tank at such times as the pilot valve stem is in neutral position.

The pilot valve stem may be constantly rotated about its longitudinal axis to prevent sticking thereof, by means of a bladed wheel or impeller 78 and a jet 79, jet 79 being connected to the supply pipe for inlet port 69. In order that the valve stem may be rotated, as above stated, it is mounted in a bearing 80, the latter being connected to the flexible connection 67.

Component 2 including power cylinder 5 may be located at some point remote from component 1. The point at which the pressure pipe 16 is connected to conduit 3 may be one that is located at a place in the pipe line quite removed from power cylinder 5. For instance, if it be assumed that pipe 3 is delivering a fuel such as gas to a burner, and it is desired to regulate the pressure at the burner, the pressure on the discharge side of the burner will be substantially atmospheric. Therefore, the pressure difference between the point where pipe 16 is connected to conduit 3 and the pressure on the discharge side of the burner will represent the differential across the burner and will be a function of the square of the rate of flow through the burner. Since the pressure acting on one side of the bellows is atmospheric and the pressure on the other side is the pressure measured by pipe 16, the bellows will be subjected to the pressure differential across the burner. If it is desired to regulate the flow through the burner to a constant value, then the form of device 39 shown in Fig. 1 will cause damper 6 to be so adjusted as to maintain the rate of flow constant because the force exerted by core 63 on the pilot valve stem through beam 64 will be proportional to the square of the output of differential transformer 4. Since the force exerted by core 63 is proportional to the square of the transformer output, the pilot valve will be positioned to one side or the other of neutral in accordance with the square of the output of transformer 4 and therefore it will be positioned in accordance with the square root of the pressure differential acting on bellows 7.

If it be desired that component 2 shall so control the operation of power cylinder 5 that a constant pressure will be maintained in pipe 3 at a given point as on the downstream side of the orifice 85, component 2 may be provided with an electro-magnetic device 86 instead of the device 39 shown in Fig. 1. In this case, the connection of ports 70 and 71 to the cylinder 5 would be reversed so that damper 6 will move towards closed position in response to rising pressure at the point in pipe 3 to which pipe 16 is connected. On falling pressures at that point in pipe 3 pressure would be delivered to the top of piston 61 whereby valve or damper 6 would open. Device 86 is similar in construction to device 9, therefore similar and corresponding parts will be designated by the same reference characters.

Since the coil winding of device 86 operates in a permanent and constant magnetic field and against the tension of spring 66', the force exerted by that coil winding or beam 64 will be linearly proportional to the electric output of the differential transformer 4 and will therefore be linearly proportional to the pressure delivered to housing 8. Therefore, a system comprising component 1 and the modified component of Fig. 2, will operate to so control the operation of power cylinder 5 that the pressure of the downstream side of an orifice 85, will be maintained substantially constant at the control point of the regulating apparatus.

By adjusting the position of fulcrum 11 relative to the position at which bellows 7 and coil winding 38 act on beam 10, the output range of the differential transformer 4 may be adjusted with respect to the range of input pressures to housing 8.

Component 1 is shown, described and claimed in my co-pending application Serial Number 184,569, filed September 13, 1950, and assigned to Hagan Corporation, Pittsburgh, Pennsylvania.

From the above description, it will be apparent to those skilled in this art, that various modifications and changes may be made in the illustrated embodiment of the invention without departing from either the scope or spirit thereof.

Therefore, what is claimed as new and desired to be secured by Letters Patent is:

1. A system for regulating flow of a fluid through a conduit provided with a pressure regulating valve therein comprising a device having a lever mounted on a fulcrum, a pressure deflectable element connected to said beam and responsive to said fluid pressure for exerting a turning force thereon that varies in magnitude with the value of the pressure at any instant, a differential transformer having input and output windings and a movable core, one of said windings comprising a pair of differentially connected coils, whereby the output of said transformer varies between zero and a maximum value as the core is moved from a neutral position to a position removed from neutral, means for amplifying said output voltage, a balancing device having a permanent magnet and a coil winding in the field thereof and connected to said beam, said coil winding being connected in circuit with said transformer output and exerting a force on the beam that opposes and balances the force of said pressure deflectable member, a regulating device comprising a pilot valve having an inlet port, two outlet ports and an exhaust port for each outlet port and a valve member having a neutral position in which the outlet ports are closed and two transmitting positions one on each side of neutral whereby pressure may be transmitted selectively through one or the other of said outlet ports whilst the non-sending port is connected to exhaust, a power cylinder having a piston coupled to said valve and connections from said outlet ports to opposite ends of said cylinder whereby the piston may be actuated and arrested in accordance with the position of said pilot valve-member, means urging said valve in one direction from neutral and electro-magnetic means including a coil winding and core one of which is connected to said pilot valve-member, and disposed to actuate the same in a direction opposite to that in which it is moved by said urging means, said coil winding being connected in series circuit with the coil winding of said balancing device.

2. A pilot valve mechanism for controlling the operation of an hydraulic power cylinder comprising a valve body having an inlet port, outlet ports adapted for connection to the opposite ends of a power cylinder, and exhaust ports, a movable member in said body having means for selectively establishing flow communication between one of the outlet ports and said inlet port and between the other of said outlet ports and one of the exhaust ports, said movable member having a neutral position in which communication between said outlet ports and the inlet port is shut off, means urging said valve in a direction to establish communication between one of the outlet ports and the inlet port and to connect the other outlet port to exhaust, and electro-magnetic means comprising a core and a coil winding movable relative to the core, one of which is connected to said valve and disposed to actuate the same in a direction opposite to that in which it is actuated by said urging means, and means for variably energizing said coil winding.

3. Regulating apparatus for fluids flowing through a passageway having therein a flow controlling element, said apparatus comprising means adapted to respond to the regulated pressure in said conduit and develop an electric current output that is proportional to the deviation of said regulated pressure from a predetermined value, means for actuating said flow controlling element, and means for controlling the operation of said flow controlling element comprising a power cylinder having a reciprocating piston therein connected to said flow controlling element, a valve for controlling the admission of motive fluid to said cylinder on opposite sides of said piston, said valve having a neutral and two "on" positions, one for each side of the piston, force producing means urging said valve in a direction away from neutral whereby the piston is caused to move said flow controlling element towards flow decreasing position, and means responsive to and energized by said electric current output for exerting a force on said valve to actuate the same in the opposite direction and cause said flow controlling element to be actuated toward increased flow position, said valve being in neutral position when the electric output corresponds in magnitude to the predetermined value of said regulated pressure.

4. Regulating apparatus according to claim 3, characterized by the fact that the means that is responsive to and energized by said electric current output comprises an electro-magnetic device including a magnetizable core and a coil winding that is movable relative thereto, one of which is connected to said valve, the core being magnetizable in proportion to the ampere turns of the coil winding and the force exerted on the valve being proportional to the square of the current traversing said coil winding.

5. Regulating apparatus according to claim 3, characterized by the fact that the means responsive to and energized by said electric current output comprises an electro-magnetic device including a stationary permanent magnet and a movable coil winding disposed in the field thereof, said winding being connected to said valve and exerting a force thereon that is linearly proportional to the current traversing said coil winding.

6. Regulating apparatus for fluids flowing through a passageway having therein a flow controlling element, said apparatus comprising means adapted to respond to the regulated pressure in said conduit and develop an electric current output that is proportional to the deviation of said regulated pressure from a predetermined value, means for actuating said flow controlling element, and means for controlling the operation of said flow controlling element comprising a power cylinder having a reciprocating piston therein connected to actuate said flow controlling element, a valve for selectively controlling the admission of motive fluid to said cylinder on opposite sides of said piston, a lever mounted on a fulcrum, a coupling connecting said lever and valve, means biasing said lever and valve in one direction, and means responsive to and energized by said electric output for exerting a force on said valve to actuate the same in a direction opposite that in which it is actuated by said biasing means, the current output responsive means comprising a magnetizable core and a coil winding that is movable relative thereto, one of which is connected to said lever, the core being magnetizable in proportion to the ampere turns of the coil winding at any instant and the force exerted thereby on said lever being proportional to the square of the current traversing said coil winding.

7. Regulating apparatus for fluids flowing through a passageway having therein a flow controlling element, said apparatus comprising means adapted to respond to the regulated pressure in said conduit and develop an electric current output that is proportional to the deviation of said regulated pressure from a predetermined value, means for actuating said flow controlling element, and means for controlling the operation of said flow controlling element comprising a power cylinder having a reciprocating piston therein connected to said flow controlling element, a valve for controlling the admission of motive fluid to said cylinder on opposite sides of said piston, a lever mounted on a fulcrum, a coupling connecting said lever and valve, means biasing said lever and valve in one direction, and means responsive to and energized by said electric output for exerting an actuating force on said valve that acts in a direction opposite that in which the force of said biasing means acts, the current output responsive means comprising a stationary permanent magnet and a movable coil winding disposed in the field thereof, said winding being connected to said lever and exerting a force thereon that is linearly proportional to the current traversing the same.

8. Regulating apparatus according to claim 7, characterized by the fact that the coupling between the lever and valve comprises a flexible member connected at its upper end to the lever and having at its lower end a rotatable member provided with radial blades, said rotatable member being connected to said valve for rotating the same, and a jet disposed to deliver fluid against said blades and thereby rotate the same.

9. Regulating apparatus according to claim 3, characterized by the fact that the means responding to the regulated pressure comprises a beam mounted on a fulcrum, a pressure deflectable member responsive to said regulated pressure and connected to said beam and exerting a force thereon tending to turn it in one direction, a differential transformer actuated by said beam and arranged to deliver an alternating voltage output that varies in magnitude with the value of said regulated pressure at any instant, means for rectifying said voltage output, and electro-magnetic balancing means comprising a coil winding and a core movable relative thereto in flux linking relation with said winding, one of which is connected to said beam and arranged to exert a force thereon that opposes the force of said pressure deflectable member, said coil winding being energized by said rectified output and connected in circuit with the valve actuating electric output responsive means.

ALFRED A. MARKSON.

References Cited in the file of this patent

UNITED STATES PATENTS

| Number | Name | Date |
|---|---|---|
| 1,550,467 | Thoma | Aug. 18, 1925 |
| 2,020,847 | Miteroff | Nov. 12, 1935 |
| 2,112,682 | Ryder | Mar. 29, 1938 |
| 2,131,481 | O'Connor | Sept. 27, 1938 |
| 2,339,289 | Olken | Jan. 18, 1944 |
| 2,541,199 | Broida | Feb. 13, 1951 |